Dec. 11, 1934.   P. ZIELINSKI   1,984,206
SPRING MOTOR
Filed Dec. 21, 1932   2 Sheets-Sheet 1

Inventor:
Peter Zielinski
By Brayton Richards
Atty.

Dec. 11, 1934.  P. ZIELINSKI  1,984,206
SPRING MOTOR
Filed Dec. 21, 1932  2 Sheets-Sheet 2
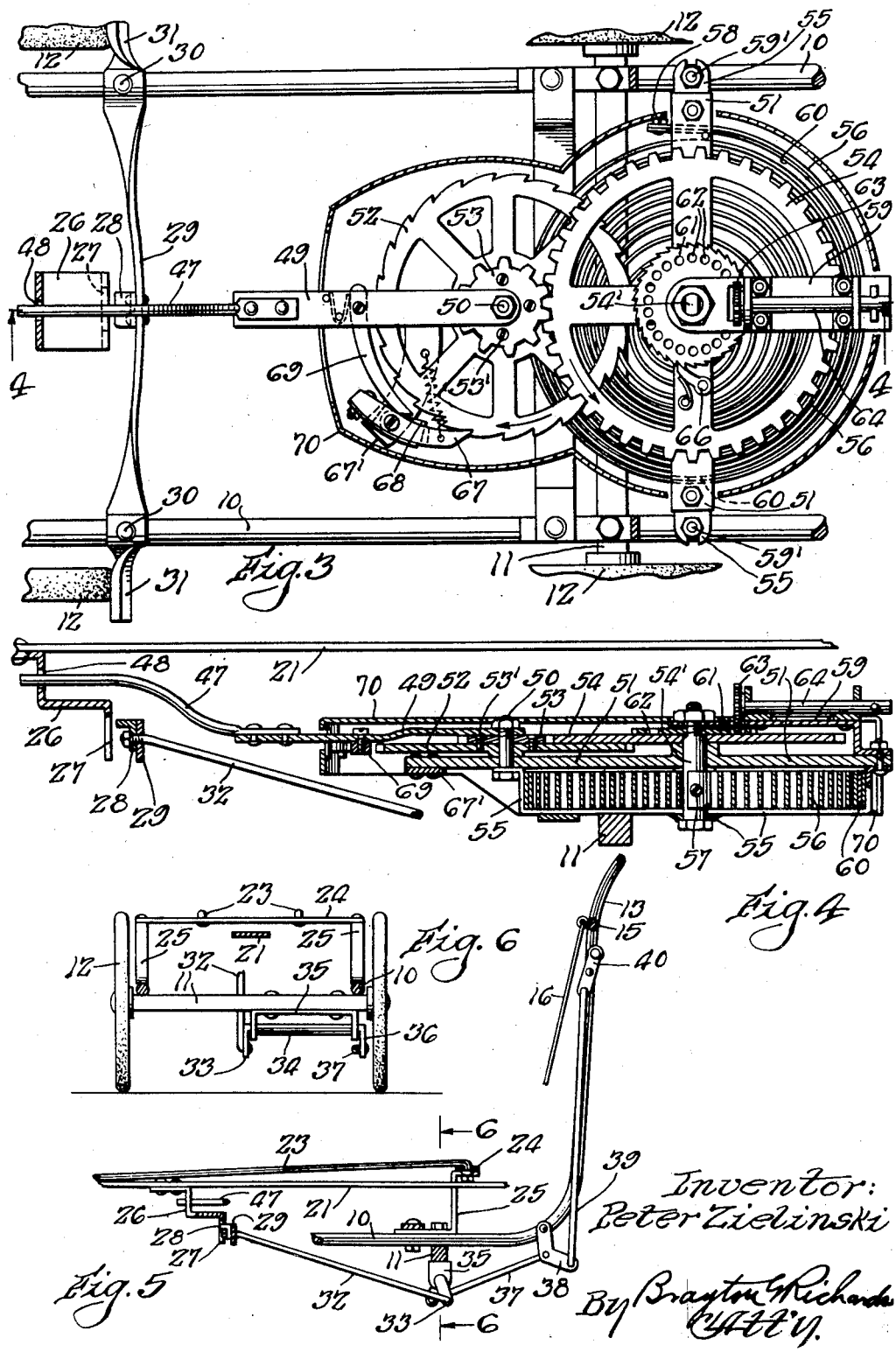

Patented Dec. 11, 1934

1,984,206

UNITED STATES PATENT OFFICE 1,984,206

SPRING MOTOR

Peter Zielinski, Chicago, Ill.

Application December 21, 1932, Serial No. 648,218

4 Claims. (Cl. 185—38)

The invention relates to an improved spring motor of simple construction and highly efficient in use.

Another object of the invention is the provision of an improved spring motor especially constructed and arranged to utilize the force of a spring for producing timed oscillatory motion.

Other objects will appear hereinafter.

The invention consists in the combinations and arrangements of parts hereinafter described and claimed.

Figure 1:
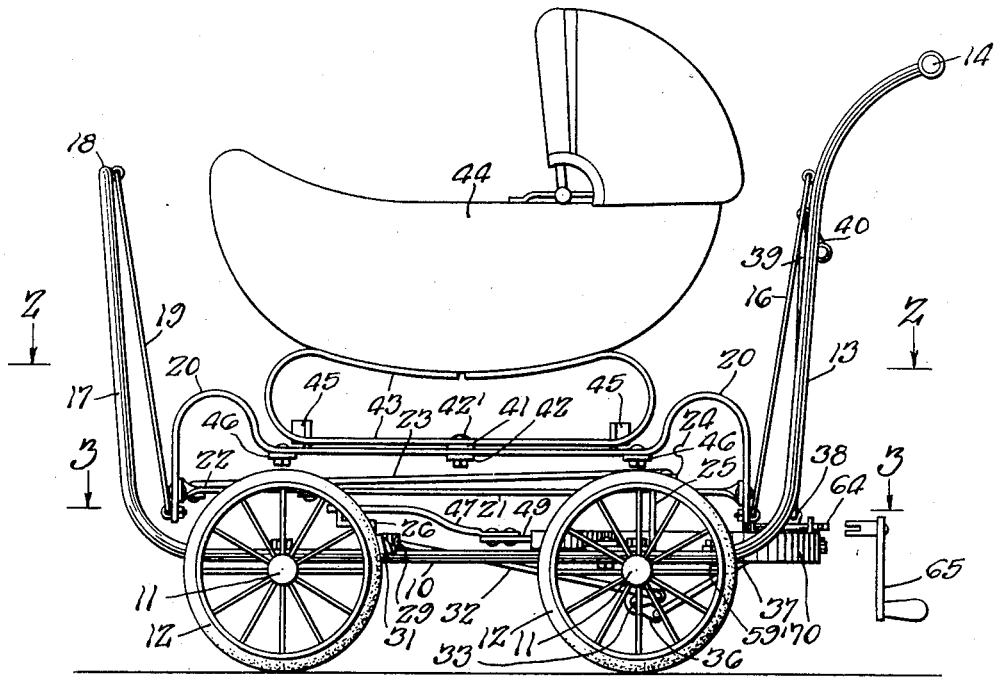
Figure 2:
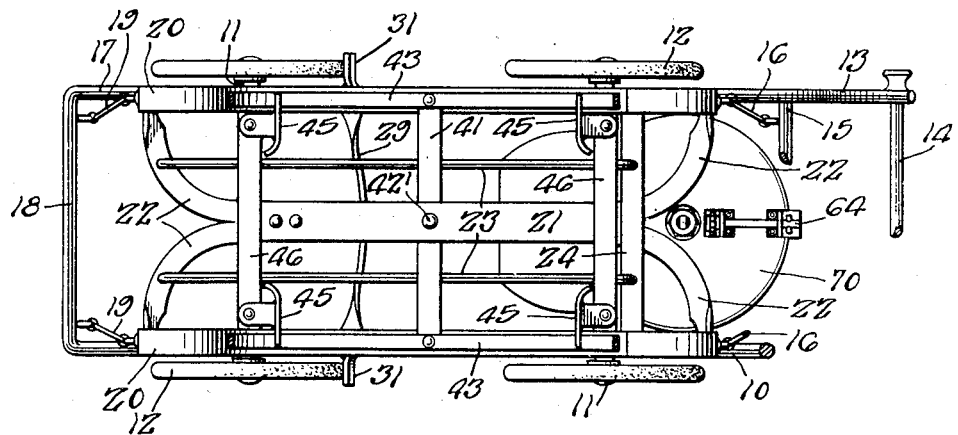

The invention will be best understood by reference to the accompanying drawings forming a part of the specification, and in which Fig. 1 is a side view of a construction embodying the invention;

Fig. 2, a horizontal section of the same taken substantially on line 2—2 of Fig. 1;

Fig. 3, an enlarged partial horizontal section taken substantially on line 3—3 of Fig. 1;

Fig. 4, a section taken substantially on line 4—4 of Fig. 3;

Fig. 5, a partial detail section taken through the rear portion of the construction; and Fig. 6, a section taken substantially on line 6—6 of Fig. 5.

The embodiment of the invention illustrated in the drawings comprises a main frame having side bars 10 mounted upon suitable axles 11 equipped with suitable wheels 12 so as to constitute a main frame for the construction. At the rear, the side bars 10 are bent upwardly and rearwardly to constitute a handle frame 13 terminating at its upper end in a suitable handle 14 for manipulating the construction as a baby buggy. A cross-bar 15 is arranged between the upper portions of the handle members 13 and two suspending links 16 are supported by suitable screw eyes as shown on the bar 15 so as to be capable of swinging freely in any direction.

At the front, the side bars 10 are similarly extended upwardly to form a supporting frame 17 terminating at its upper end in a supporting bar 18 to which are attached two swinging links 19 similar in all respects to the links 16.

A supporting frame is mounted on the links 16 and 19, said supporting frame comprising spring side bars 20 and a central, longitudinal bar 21 having divergent arms 22 at its opposite ends secured as shown to the ends of the spring side bars 20, thereby forming a spring supporting frame swinging freely on the links 16 and 19. Two parallel controlling links 23 are pivoted at their forward ends to the forward arms 22 and at their rearward ends to a cross-bar 24 mounted on standards 25 secured to the side bars 10 of the main frame, as best shown in Figs. 2 and 5. By this arrangement, the swinging of the supporting frame is controlled so as to prevent longitudinal swinging thereof but to permit of free lateral swinging or rocking of the suspending links 16 and 19.

Arranged on the underside of the longitudinal bar 21 of the supporting frame is an annular bracket 26, best shown in Fig. 4. The lower end of the bracket 26 is provided with a locking notch 27 adapted to engage a locking lug 28 secured to the forward side of a transverse, flexible combined locking and braking bar 29 pivoted at the points 30 to the side bars 10 of the main frame. The protruding ends 31 of the bar 29 are formed and shaped to constitute brake shoes to contact with the peripheries of the front wheels 12 of the main frame. The arrangement is such that when the bar 29 is flexed rearwardly, as shown in Fig. 3, the locking lug 28 will be withdrawn from the notch 27 thereby freeing the supporting frame for lateral swinging or rocking and at the same time the brake shoes 31 will be applied to the wheels 12 with sufficient force to lock said wheels against rolling or revolving so as to prevent movement of the construction when the same is to be used as a cradle.

As best shown in Figs. 5 and 6, an operating rod 32 is secured centrally to the bar 29 extending thence rearwardly and downwardly to connect with a rocker arm 33 on a rocker shaft 34 mounted in a bracket 35 on the underside of the rear axle 11. The rocker shaft 34 also carries another rocker arm 36 connected by a link 37 with an annular lever 38 fulcrumed on the corresponding side bar 10 and connected by a link 39 with the operating handle 40 whereby, when said operating handle 40 is swung upwardly into the position indicated in Fig. 5, the locking lug 28 will be withdrawn from the notch 27, thereby freeing the supporting frame for lateral rocking and at the same time automatically applying the brake shoes 31 to the front wheels 12.

As best shown in Figs. 1 and 2, a cross-bar 41 is pivotally connected at 42' on a central cross-bar 42 on the supporting frame. At its opposite ends the cross-bar 41 carries support springs 43 on which a baby buggy body 44 of any suitable or desired construction is mounted, as indicated in Fig. 1. Locking detents 45 are pivotally mounted on cross-bars 46 of the supporting frame in positions to swing over the springs 43 and lock said baby buggy from lateral swinging on pivot 42'. By this arrangement, the position of the body 44 may be adjusted as desired when the construction is used as a cradle or locked against said movement when the construction is to be used as a baby buggy.

As best shown in Figs. 1, 3 and 4, a rocker arm 47 is arranged to slide freely through an opening 48 in the bracket 26 extending thence rearwardly and downwardly to connect with a rocker bar 49 mounted to oscillate freely on a stud bolt 50 attached to a rigid frame supporting arm 51. A ratchet wheel 52 is loosely mounted on the stud bolt 50 and carries a pinion 53 rigidly secured to the ratchet 52 by means of screws 53'. The pinion 53 meshes with a gear 54 rigidly mounted on the squared end of a clock spring shaft 54'. The shaft 54' is mounted in a suitable supporting bracket 55 secured, as shown, to the underside of the frame of the arm 51, as indicated. A clock spring 56 is arranged as indicated within the bracket 55 having one end secured by screw 57 to the shaft 54'. The other end of the clock spring 56 carries a stop bolt 58 arranged to engage the supporting frame work 59 which is secured by screws 59' to the side bars 10 of the main frame.

A reinforcing strip or plate 60 is secured to the inner side of the end of spring 56 by means of the bolt 58 extending thence substantially one-quarter of a turn or coil of said spring, the end of said strip 60 being otherwise free from the spring 56. The strip 60 serves as a guard or stiffening member and serves to hold the end of the spring in correct circular form. A ratchet wheel 61 fits snugly over the squared end of the shaft 54' and is provided with gear teeth openings 62 intermeshing with the teeth of a gear 63 on a winding shaft 64 co-operating with a winding handle 65, shown in Fig. 1, to permit of the winding of the clock spring 56, as will be readily understood.

A spring-held pawl 66 mounted on gear 54 co-operates with the ratchet 61 to permit of the winding of the spring 56 and the placing of the gear 54 under the tension of said spring when wound so that the tendency of the spring 56 will be to rotate the gear 54 and through it the gear 53 and ratchet 52, as will be readily understood, said mechanism constituting a form of clock spring mechanism for operating the ratchet 52.

A spring-held pawl 67 is mounted on a rigid arm 67' of the plate 51 to engage the ratchet 52 and normally prevent rotation of said ratchet. The pawl 67 carries a cam block 68 co-operating with the end of another spring-held pawl 69 mounted on the underside of the rocker arm 49, the arrangement being such that when the pawl 69 is forced in between the pawl 67 and the periphery of the ratchet 52, the pawl 67 will be forced outwardly by the wedging action of pawl 69, to release the ratchet 52 for a partial rotation under the influence of the spring 56, as will be readily understood.

At the time the pawl 67 is released from the ratchet 52, the pawl 69 is in position to engage the next tooth of said ratchet so as to lock the arm 49 to the ratchet 52. The influence of the spring will then rock the arm 49 backwardly about pivot 50, thereby withdrawing the pawl 69 and causing the pawl 67 to re-engage the ratchet after a peripheral movement equal to the length of one of the ratchet teeth. As will be observed in Fig. 3 of the drawings, the spring for the pawl 69 normally holds said pawl out of engagement with the ratchet 52, so that when pawl 69 is thus withdrawn from under the pawl 67, the spring will automatically withdraw the pawl 69 from said ratchet, thereby releasing the bar 49 for return movement. As has been previously indicated, the arm 49 is in operative connection with the bracket 26 on the underside of the supporting frame so that this backward swing of the arm 49 imparts a corresponding backward oscillatory impulse to the supporting frame to keep the same swinging or oscillating.

Thus, when the stop lug 28 is withdrawn from the bracket 26 to release the supporting frame as explained above, and the buggy body 44 is given a preliminary swing to start the operation of the pawl 69, as explained above, the tension of the spring 56 will automatically continue such oscillation or rocking of the buggy body until the tension of the spring is practically exhausted. Thus, when the handle 40 is manipulated to convert the construction into a cradle, the buggy body 44 is automatically released for oscillating or rocking movement. Then by giving the buggy body a slight preliminary oscillation, the oscillation or rocking thereof will be continued until the tension of the spring 56 has been exhausted. A suitable casing or housing 70 is placed over the clock spring mechanism so as to prevent injury to the fingers of the children and exclude dust and dirt therefrom.

By means of the arrangement set forth, a simple and effective construction is provided which will serve either as a baby buggy or as a baby cradle and the act of converting the construction from a baby buggy into a cradle will release the buggy body for lateral oscillating or rocking motion to induce sleep or contentment in the mind of the baby. The specific form and arrangement of parts is a simple and effective one for the purpose.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

I claim:

1. A spring motor comprising a shaft; a spring connected for operating said shaft; means for winding said spring; a gear operable by said shaft; a pinion meshing with said gear; a ratchet carried by said pinion; a pawl normally preventing operation of said ratchet by said spring; an oscillatory arm carrying a second pawl arranged to be interposed between said first pawl and ratchet upon oscillation of said arm in one direction to release the first pawl by wedging action and engage said ratchet after slight movement thereof; oscillation of said arm in the opposite direction serving to withdraw said second pawl to release said ratchet and permit said first pawl to re-engage said ratchet; and means for utilizing the oscillations of said arm.

2. A spring motor comprising a shaft; a spring connected for operating said shaft; means for winding said spring; a ratchet connected to be operated by said shaft; a pawl normally preventing operation of said ratchet by said spring; and an oscillatory arm carrying a second pawl arranged to be interposed between said first pawl and ratchet upon oscillation of said arm in one direction to release the first pawl by wedging action and engage said ratchet after slight movement thereof oscillation of said arm in the opposite direction serving to withdraw said second pawl to release said ratchet and permit said first pawl to re-engage said ratchet.

3. A spring motor comprising a transverse supporting arm; a stud bolt attached to said arm; a ratchet wheel loosely mounted on said stud bolt; a spring-held pawl for said ratchet wheel; a pinion rigidly secured to the ratchet wheel; a gear meshing with said pinion; a clock spring operatively connected with said gear; a second ratchet wheel arranged to wind said clock spring; a pawl for said second ratchet wheel; means for operating said second ratchet wheel to wind said spring; an oscillatory arm in operative relation with said first mentioned ratchet wheel; and a spring-held pawl on said oscillatory arm arranged to be interposed between said first mentioned pawl and its ratchet wheel upon oscillation of said arm in one direction to release the first pawl by wedging action and engage said ratchet after slight movement thereof oscillation of said arm in the opposite direction serving to withdraw said second pawl to release said ratchet and permit said first pawl to re-engage said ratchet.

4. A spring motor comprising a shaft; a main spring connected for operating said shaft; means for winding said spring; a gear operable by said shaft; a pinion meshing with said gear; a ratchet carried by said pinion; a pawl cooperating with said ratchet; a spring normally holding said pawl in engagement with a tooth of said ratchet to prevent operation thereof by said main spring; an oscillatory arm carrying a second pawl interposed between said first pawl and said ratchet and equipped with a spring normally holding it out of engagement with the ratchet and into wedging engagement with said first mentioned pawl, the arrangement being such as to cause said second pawl to wedge itself between said first pawl and an adjacent tooth of said ratchet, thereby releasing said first pawl from said ratchet and itself being held by said first pawl in position engaging the adjacent tooth thereof upon oscillation of said arm in one direction, oscillation of said arm in the opposite direction serving to withdraw said second pawl to release said ratchet and to permit said first pawl to re-engage the ratchet; and means for utilizing the oscillations of said arm.

PETER ZIELINSKI.